United States Patent [19]
Taylor et al.

[11] Patent Number: 5,997,938
[45] Date of Patent: *Dec. 7, 1999

[54] PROCESS FOR PREPARING IMPROVED OVEN-FINISHED FRENCH FRIES

[75] Inventors: Kyle McLennan Taylor, Mason; Jeffrey John Kester, West Chester; Joseph James Elsen, Cincinnati; Patrick Joseph Corrigan, Cincinnati; David Thomas Biedermann, Cincinnati; Alyce Johnson Papa, Cincinnati, all of Ohio

[73] Assignee: The Procter & Gamble Company, Cincinnati, Ohio

[ * ] Notice: This patent is subject to a terminal disclaimer.

[21] Appl. No.: 08/967,289

[22] Filed: Nov. 7, 1997

Related U.S. Application Data

[63] Continuation of application No. 08/639,232, Apr. 29, 1996, abandoned.

[51] Int. Cl.⁶ ..................................................... A23L 1/217
[52] U.S. Cl. ............................................. 426/637; 426/523
[58] Field of Search ..................... 426/438, 637, 426/302, 523, 243

[56] References Cited

U.S. PATENT DOCUMENTS

| | | |
|---|---|---|
| 2,855,308 | 10/1958 | Buechele . |
| 2,962,419 | 11/1960 | Minich . |
| 3,397,993 | 8/1968 | Strong . |
| 3,579,548 | 5/1971 | Whyte . |
| 3,865,964 | 2/1975 | Kellermeier ............................ 426/307 |
| 3,932,532 | 1/1976 | Hunter . |
| 3,934,046 | 1/1976 | Weaver ................................... 426/418 |
| 4,005,195 | 1/1977 | Jandacek . |
| 4,109,020 | 8/1978 | Gorfien . |
| 4,219,575 | 8/1980 | Saunders . |
| 4,325,295 | 4/1982 | Caridis ....................................... 99/339 |
| 4,508,746 | 4/1985 | Hamm ..................................... 426/601 |
| 4,542,030 | 9/1985 | Haury et al. ........................ 426/637 X |
| 4,551,340 | 11/1985 | El-Hag . |
| 4,582,927 | 4/1986 | Fulcher . |
| 4,590,080 | 5/1986 | Pinegar ................................... 426/441 |
| 4,632,838 | 12/1986 | Doenges ................................. 426/441 |
| 4,840,815 | 6/1989 | Meyer ..................................... 426/611 |
| 4,861,613 | 8/1989 | White ...................................... 426/611 |
| 4,888,195 | 12/1989 | Huhn ....................................... 426/601 |
| 4,888,196 | 12/1989 | Ehrman ................................... 426/601 |
| 4,900,576 | 2/1990 | Bonnett .................................. 426/438 |
| 5,000,970 | 3/1991 | Shanbhag ............................... 426/296 |
| 5,085,884 | 2/1992 | Young ..................................... 426/611 |
| 5,104,678 | 4/1992 | Yang ....................................... 426/601 |
| 5,288,512 | 2/1994 | Seiden .................................... 426/607 |
| 5,302,410 | 4/1994 | Calder . |
| 5,308,640 | 5/1994 | Baer ........................................ 426/611 |
| 5,422,131 | 6/1995 | Elsen ...................................... 426/531 |
| 5,648,110 | 7/1997 | Wu . |

FOREIGN PATENT DOCUMENTS

| | | |
|---|---|---|
| 0 026 565 | 1/1980 | European Pat. Off. . |
| 0 342 059 | 12/1989 | European Pat. Off. . |
| 2.215.902 | 1/1974 | France . |
| 27 13935 | 3/1977 | Germany . |
| 38 14587 A1 | 4/1988 | Germany . |
| 2 078 081 | 1/1981 | United Kingdom . |
| WO 91/00023 | 1/1991 | WIPO . |
| WO 91/15964 | 10/1991 | WIPO . |
| WO 94/05165 | 3/1994 | WIPO . |

OTHER PUBLICATIONS

Talbert et al, "Potato Processing", pp. 491–529, (1987).
"Flavored Vegetable Oils as a Substitute for Beef Tallow in Deep Frying Applications", *Food Technology*, pp. 90–94 (1989).

*Primary Examiner*—Arthur L. Corbin
*Attorney, Agent, or Firm*—Jay A. Krebs; Karen F. Clark; Jacobus C. Rasser

[57] ABSTRACT

The present invention provides a process for quickly oven finishing (baking) oil-enrobed prebake fries in as litle as 0.75 minute at a temperature of from about 325° F. (162° C.) to about 800° F. (426° C.) to provide oven-finished French fries that have virtually the same taste and characteristics as deep fat fried finished French fries. The oven-finished shoestring French fries of this invention are characterized as having: a bulk moisture of from about 32% to about 46%; a total fat content of from about 12% to about 25%; and a French Fry Texture Value of at least about 200. Preferably the fries have a surface water activity (Aw) of less than about 0.55 and an internal moisture content of from about 55% to about 80%.

15 Claims, No Drawings

PROCESS FOR PREPARING IMPROVED OVEN-FINISHED FRENCH FRIES

This is a continuation of application Ser. No. 08/639,232, filed on Apr. 29, 1996, now abandoned.

TECHNICAL FIELD

The present invention relates to a process for oven-finishing French fries.

BACKGROUND OF THE INVENTION

French fries are prepared by deep fat frying fresh or "par-fried" potato strips. A major drawback associated with deep fat frying is handling the hot frying oil. Baking the par-fries in an oven avoids this hot frying oil problem. However, there are some major problems associated with state of the art oven-finished French fries. One of the major problems is that a high quality French fry that tastes deep fried is difficult to consistently duplicate in an oven. In other words, a reliable process for making high quality deep fat fried-like oven finished French fries is heretofore unknown. Current oven-finished French fries are generally too limp and soggy or too dry and tough. High quality deep fat fried French fries have a moist interior surrounded by a crisp yet tender outer surface or crust.

It has now been surprisingly discovered that high quality French fries can be prepared quickly and reliably by a specific process comprising baking oil enrobed prebake fries in an oven.

It is an object of the present invention to provide a process for making high quality deep fat fried-like French fries in an oven. It is another object of the present invention to provide a fast food process for quickly finishing frozen par-fries in an oven. It is yet another object of the present invention to provide improved tasting high quality deep fat fried-like oven-finished French fries. Other objects of the present invention will become apparent in view of the following description.

SUMMARY OF THE INVENTION

The present invention provides a process for quickly oven finishing (baking) oil-enrobed prebake fries to provide oven-finished French fries that have virtually the same taste and characteristics as deep fat fried French fries. The oven-finished shoestring French fries of this invention are characterized as having: a bulk moisture of from about 32% to about 46%; a total fat content of ftom about 12% to about 25% and a Texture Value of at least about 200. Preferably the fries have a surface water activity (Aw) of less than about 0.55, and an internal moisture content of from about 55% to about 80%.

DETAILED DESCRIPTION OF THE INVENTION

Unless otherwise stated, all percentages, ratios and proportions expressed herein are by weight. As used herein, the terms "par-fry" or "par-fried" or "par-fries" all refer to potato strips that have been subjected to at least one frying process; e.g., deep-fat frying. The parfry has a lower moisture than a raw potato strip and contains some fat or oil from the frying process.

The term "prebake fries" refers to parfries that have been coated (enrobed) with oil on the surface and are ready for oven-finishing in accordance with the present invention.

The term "oven-finished" refers to a product that has been subjected to a baking process and is in the ready-to-eat form.

The terms "fat" or "oil" both refer to any edible fatty substances in a general sense; e.g., 100% natural or 100% synthesized fats and oils, etc., unless otherwise specified. Preferred oils consist essentially of triglycerides, such as, for example soybean oil, corn oil, cottonseed oil, sunflower oil, palm oil, coconut oil, fish oil, and edible animal oil such as tallow. These oils can be partially or completely hydrogenated or modified by interesterification. The terms "fat" or "oil" also refer 100% non-toxic fatty materials having properties similar to triglycerides. The terms "fat" or "oil" in general include fat-substitutes, which materials may be partially or fully nondigestible.

The terms "fat" and "oil" are used interchangeably unless otherwise specified.

The term "fat substitute" refers to those edible fatty materials that are partially or totally nondigestible, e.g., polyol fatty acid polyesters, such as olestra.

The term "conditioned oil" refers to oil which has been previously used for frying for such a time that it has developed fried flavor.

The terms "enrobed" or "coated" refers to a product having a substantially uniform coating of oil or fat on the surface. The oil coating can be discontinuous (i.e. globules or droplets) or continuous. Preferably at least 75% of the surface is coated.

The present invention relates to a process for finish cooking oil-enrobed prebake fries by baking the oil-enrobed prebake fries in an oven for from about 0.75 minute to about 15 minutes at a temperature of from about 325° F. (162° C.) to about 800° F. (426° C.). The oven-finished French fries of this invention taste as if they are deep fat fried French fries. They are superior in quality compared to the state of the art oven-finished French fries. The oven-finished French fries made by the process of this invention (shoestring-cut) have a bulk moisture of from about 32% to about 46%; a total fat content of from about 12% to about 25%; and a Texture Value of at least about 200. Preferably the fries have a surface water activity (Aw) of less than about 0.55 and an internal moisture content of from about 55% to about 80%.

Some important attributes in French fried potatoes are bulk moisture, total fat, surface water activity (Aw), crust crispness and interior texture. The external surfaces of good textured French fries are moderately crisp and not excessively oily. The interior portions are tender, mealy and free from sogginess. A French Fry Texture Value, as defined herein, has been developed to characterize these fries, a Texture Value of greater than about 200 represents a crisp fry with a moist interior.

Selected oil-enrobed prebake fries with certain bulk moistures and oil levels, when oven finished via the process described herein, provide superior French fries over the state of the art oven-finished French fries.

Prebake Fries

The prebake fries of this invention provide greater flexibility in meal preparation, simplification in storage, inventory control and are more uniform in quality versus preparing French fries directly from raw potatoes.

Raw potatoes or par-fried potato strips are starting materials for the prebake fries. Raw potatoes (e.g., Russet Burbanks) are washed, peeled, trimmed and cut into strips of a desired size and shape customarily used for French fries. After cutting, the strips can be washed to remove surface starch.

The preferred potato strips are known in the art as "shoestring" cuts. Shoestring potato strips are from about 3/16(0.18) to about 5/16 (0.3) inch (4.7–8 mm) square in cross-section and from about 2.5 to about 5 inches (6.3–12.7 cm) in length.

Another cut known in the art as "crinkle cut" strips usually average from about 0.3 to about 0.5 inch (8–13 mm) in cross-section and from about 2 to about 4 inches (5–10.2 cm) in length.

Straight cut thick potato strips (also called regular-cut) are from about 0.3 inch to about 0.5 inch (8 mm—13 mm) square in cross-section and about 2.5 to about 5 inches (6.3–12.7 cm) in length. Larger potato strips of the type referred to as "steak fries" have a rectangular cross-section of about 0.5 inch to about 0.88 inch (13–22 mm) and about 2.5 to about 5.5 inches (6.3–14 cm) in length.

The potato strips are blanched according to conventional procedures known in the art. Blanching inactivates enzymes and removes excess free sugars from the surfaces of the cut strips. Blanching is done by immersion of the strips in hot water at a temperature of about 140° F. (60° C.) to about 200° F. (93° C.) for about 3 to about 20 minutes. Alternatively, the blanching is with steam, at atmospheric pressure for about 2 to about 10 minutes.

Following the blanching step, the potato strips can be treated according to conventional methods known in the art. For instance, the potato strips may be subjected to additional water immersion steps to further leach excess sugars or the strips may be treated with sodium acid pyrophosphate (SAPP), a chelating agent used to prevent discoloration of the strips. Dextrose (corn sugar) can also be applied to the surface of the strips in order to yield a desired level of brown color development during subsequent processing. Other treatments known in the art can also be used.

After blanching and the optional treatments described above, the potato strips are drained and optionally dehydrated to reduce their moisture content. During dehydration of the strips the moisture content is typically reduced to a point at which the strips have lost from about 10% to about 30% of their initial weight, preferably about 15% to about 20% of their initial weight. Any of the conventional drying procedures used in the production of par-fried potato strips may be used, such as, for example, subjecting the potato strips to heated air at temperatures of from about 150° F. (65° C.) to about 350° F. (176° C.) for from about 5 to about 20 minutes. Microwave or radio-frequency drying may also be used.

Generally the blanched potato strips are deep fried or immersed in oil, for example, at a temperature of from about 270° F. (132° C.) to about 385° F. (196° C). The frying time depends on the specific oil temperature, dimensions of the potato strips, the batch size, the volume of the frying kettle and the initial moisture content of the potato strips. This can be determined by one skilled in the art. Other techniques such as a heated oil spray that surrounds the potato strip with hot oil or frying in an oil foam can be used. The blanched potato strips are immersed in an edible oil for a time sufficient to produce par-fried potato strips having from about 38% to about 58% moisture. (Table I contains moisture and fat content ranges for preferred shoestringcuts used in the process of the present invention.) The parfried potato strips of the shoestring variety preferably have from about 40% to about 56% bulk moisture. Preferably these parfries have from about 42% to about 54%, and more preferably from about 44% to about 50% moisture. These parfries have from about 6% to about 25%, preferably from about 8% to about 22%, more preferably from about 10% to about 20%, and most preferably from about 12% to 18% fat Thicker cut potato strips (e.g., straight, regular-cuts or crinkle-cuts, "steak" fries) may be fried to slightly higher moisture contents. See Tables 2 and 3 for some details for these thicker potato strips.

The par-fried potato strips can be commercially prepared by multiple processing steps (i.e., one par-fry and one freezing, or multiple par-fryings and multiple freezings). The preferred par-fried potato strips must have certain moisture and fat levels.

The par-fried potato strips can be immediately enrobed with oil, or they can be cooled or frozen prior to enrobing. Chilling or freezing of the par-fries can be accomplished by methods known in the art. For example, the par-fried potato strips may be subjected to a blast of cold air at a temperature of less than about –20° F. (–29° C.), or the strips can be immersed in a liquid refrigerant, such as liquid nitrogen. Any conventional freezing process can be used. It is preferred that the par-fried potato strips be frozen quickly, i.e., in less than 20 minutes, preferably in less than 5 minutes after completion of the par-frying.

A preferred method for preparing frozen oil-enrobed prebake fries intended for oven finishing by the process of this application comprises peeling, trimming and cutting raw potatoes into strips, blanching, and reducing the moisture of the potato strips to not less than about 60% via either oven drying or parfrying. The potato strips are then immersed in oil at a temperature of from about 270° F. (132° C.) to about 335° F. (196° C.) for a time sufficient to further reduce the moisture of the strips to a final moisture content of from about 38% to about 58%. In order to ensure that the oven-finished French fry develops an outer crust similar to that of a deep fried French fry, it is necessary to coat (enrobe) the surface of the par-fried potato strips with an edible fat to yield oil-enrobed prebake fries. The surface coating can be applied immediately after removal of the par-fried potatoes from the fryer or the coating can be applied to frozen, chilled, or room temperature par-fried potato strips. The parfried potato strips are enrobed with a coating of oil on the surface (~2–15% by weight of the prebake fries) by immersion in a liquid oil or by spraying oil onto the surface or tumbling with oil. The oil-enrobed prebake fries are frozen and stored at a temperature of about 0° F. (–18° C.). The frozen oil-enrobed prebake fries are stable at 0° F. (–18° C.) for at least 3 months. When cooked in an oven by the present process, the finished French fries have improved flavor over conventional oven-cooked fries.

While not being bound to a theory, it is theorized that the enrobing oil helps prevent rapid migration of moisture from the interior of the potato strip during baking, thereby resulting in dehydration and crispening of the crust region. Typically the enrobing/coating oil is from about 2% to about 15% by weight of the par-fried potato strips, preferably from about 3% to about 12%, and more preferably an amount of from about 4% to about 10%. Any edible oil can be used.

The fat compositions used to coat or enrobe the par-fried potato strips can be applied to the surface of the potato strips by immersion, dipping, spraying, blowing, pouring, pan coating (e.g., in a revolving pan), tumble coating, rolling around in a container of a fat composition, falling film methods, enrobing, curtain coating, etc. Preferably the edible liquefied fat is applied in a substantially uniform coating by spraying the liquid fat onto the surface of the par-fried potato strips or by dipping the par-fried potato strips into the liquid fat. The coating may be continuous or discontinuous so long as it is uniformly distributed.

Specifically, the following oil spray technique can be used. The coating oil is maintained at a temperature of from about 70° F. (21° C.) to about 200° F. (93° C.), preferably from about 100° F. (37° C.) to about 180°F. (82° C.) and more preferably from about 120° F. (48° C.) to about 160° F. (71° C.). Spray nozzles are arranged to apply the oil evenly over the parfries. The oil can be atomized during the spraying or sprayed in fine droplets. The parfried potato strips are arranged in a single layer or are tumbled during spray application of the oil.

The surface oil coating can also be applied via an immersion or dipping technique. For example, the par-fried potato strips are frozen and equilibrated at 0° F. (−18° C.). The frozen par-fried strips are immersed rapidly (e.g. 1–3 seconds) into oil at a temperature of about 335° F. (168° C.) and then immediately re-frozen by immersion in liquid nitrogen. This type of enrobing process adds a coating of oil onto the surface of the par-fried potato strips sufficient to increase the weight of the strips by about 2% to about 15%.

In the process of the present invention it is important to maintain the fat in a substantially liquid state to allow the application of a sufficient and uniform coating. The application of the fat or oil before oven finishing is critical to providing a product with the texture of a conventional deep fried French fry.

The oil-enrobed prebake fries (shoestring-cut), typically comprise from about 34% to about 54% moisture. Preferably the prebake fries have a moisture content of from about 36% to about 52%, more preferably from about 38% to about 50%, and even more preferably from about 40% to about 48%. Additionally the prebake fries preferably comprise from about 8% to about 30% fat, wherein the level of surface fat is from about 2% to about 15% by weight of the fries. The prebake fries preferably comprise from about 10% to about 28%, more preferably from about 12% to about 26%, and even more preferably from about 16% to about 24% fat. Some of the oil on the prebake fries will be lost in the baking process. Thicker cut prebake fries, may have slightly different moisture and fat contents. See Tables 1–3 for a summary of the prebake fries properties.

TABLE 1

Shoestring-cuts (3/16"–5/16" cross section)

| | Parfried Potato Strips | Oil-Enrobed Prebake Fries | Oven-Finished French Fries |
|---|---|---|---|
| Moisture Range: | 38–58% H$_2$O | 34–54% H$_2$O | 32–46% H$_2$O |
| Preferred: | 40–56% H$_2$O | 36–52% H$_2$O | 33–44% H$_2$O |
| More Preferred: | 42–54% H$_2$O | 38–50% H$_2$O | 34–40% H$_2$O |
| | 44–50% H$_2$O | 40–48% H$_2$O | |
| Fat Range: | 6–25% Fat | 8–30% Fat | 12–25% Fat |
| Preferred: | 8–22% Fat | 10–28% Fat | 13–23% Fat |
| More Preferred: | 10–20% Fat | 12–26% Fat | 14–20% Fat |
| | 12–18% Fat | 16–24% Fat | |

TABLE 2

Regular-cut and Crinkle-cut (5/16"–1/2" cross section)

| | Parfried Potato Strips | Oil-Enrobed Prebake Fries | Oven-Finished French Fries |
|---|---|---|---|
| Moisture Range: | 40–60% H$_2$O | 36–56% H$_2$O | 35–50% H$_2$O |
| Preferred: | 44–56% H$_2$O | 40–52% H$_2$O | 38–48% H$_2$O |
| More Preferred: | 46–54% H$_2$O | 42–50% H$_2$O | 40–46% H$_2$O |
| Fat Range: | 6–22% Fat | 8–28% Fat | 10–22% Fat |
| Preferred: | 8–20% Fat | 10–24% Fat | 11–20% Fat |
| More Preferred: | 10–18% Fat | 14–20% Fat | 12–18% Fat |

TABLE 3

Steak Fries (1/2"–7/8" cross section)

| | Parfried Potato Strips | Oil-Enrobed Prebake Fries | Oven-Finished French Fries |
|---|---|---|---|
| Moisture Range: | 42–62% H$_2$O | 38–58% H$_2$O | 38–53% H$_2$O |
| Preferred: | 46–58% H$_2$O | 42–54% H$_2$O | 40–50% H$_2$O |
| More Preferred: | 48–56% H$_2$O | 44–52% H$_2$O | 42–48% H$_2$O |
| Fat Range: | 4–20% Fat | 6–24% Fat | 8–20% Fat |
| Preferred: | 6–18% Fat | 8–20% Fat | 9–18% Fat |
| More Preferred: | 8–16% Fat | 10–18% Fat | 10–16% Fat |

Optional Freezing Step

After coating the surface of the par-fries, the oil-enrobed prebake fries can optionally be frozen, packaged and stored for subsequent use. Typical frozen storage temperatures ranges from about −20° F. (−29° C.) to about 10° F. (−12° C.). Freezing the oil-enrobed prebake fries can be accomplished by methods known in the art. Specifically, the strips can be contacted with a liquid refrigerant at a temperature below 0° F. (−18° C.), preferably below −20° F. (−29° C.) to freeze the potato strip. It is essential that the surface of the strip be frozen, but the entire potato strip can also be frozen. The preferred liquid refrigerants are liquid fluorocarbons and liquid nitrogen. The oil-enrobed prebake fries can be dipped in a pool of the refrigerant, or sprayed with a liquid refrigerant or contacted with a gaseous refrigerants. The time required to achieve the desired degree of freezing will vary depending on such factors as the temperature of the refrigerant, the size of the potato strips, the temperature of the potato strips, etc. The freezing can either be a surface freeze or a total freeze. For example, the oil-enrobed prebake fries can be subjected to a current of cold air at a temperature below 0° F. (−18° C.). A convenient method is to use a conventional blast freezer or a high velocity current of air where the fries are subjected to a blast of cold air at a temperature of less than or equal to about −20° F. (−29° C.). Alternatively, the fries can be placed in a freezer at −10° F. (−23° C.).

Edible Fats and Oils

The fats used herein to fry and enrobe the fries are selected from the group consisting of triglycerides, non-digestible fats or reduced calorie fats and mixtures thereof. Preferred triglycerides include soybean oil, corn oil, cottonseed oil, sunflower oil, palm oil, coconut oil, canola oil, fish oil, tallow, peanut oil, medium chain triglycerides, structured triglycerides containing a combination of short or medium chain fatty acids and long chain fatty acids (e.g. Caprenin-like) and the like which may have been partially or completely hydrogenated or otherwise modified. Non-toxic fatty materials having properties similar to triglycerides, herein referred to as fat substitutes can be partially or fully indigestible. Reduced calorie fats and edible non-digestible fats, oils or fat substitutes can also be used.

A variety of edible fats and oils may be used to coat the surface and to fry the par-fried potato strips. Edible fats and oils suitable for use include but are not limited to those listed above. If desired the oils may be conditioned or flavored, see Flavored Vegetable Oils as a Substitute for Beef Tallow in Deep Frying Applications, Food Technology, pp. 90–94 (1989) and U.S. Pat. No. 5,104,678 (Yang et al.).

Preferably the edible fat or oil used to fry and enrobe the parfried potato strips has a free fatty acid level of about 0.8% or less.

The edible oils used for frying or enrobing the par-fried potato strips can be a 100% natural oil or a 100% synthetic oil. The oil may be partially or completely hydrogenated or modified otherwise. The preferred fat substitute are fatty materials having properties similar to triglycerides such as sucrose polyesters. OLEAN™ is a preferred fat substitute. It is made by The Procter and Gamble Company. Reduced calorie fats, polyol fatty acid polyesters, and diversely esterified polyol polyesters or combinations of regular fats and fat substitutes can also be used herein. These preferred nondigestible fat or oil substitute compositions are described in the literature, for example, in Young; U.S. Pat. No. 5,085,884; Issued Feb. 4, 1992, and U.S. Pat. No. 5,422,131, issued Jun. 6, 1995 to Elsen et al.

One reduced calorie fat that has been found to be useful comprises a fairly high level (e.g., at least about 85%) of combined MML and MLM triglycerides, where M is typically a mixture of $C_8$–$C_{10}$ saturated fatty acids and L is predominantly behenic acid, but can be $C_{20}$–$C_{24}$. See U.S. Pat. No. 4,888,196 to Ehrman et al., issued Dec. 9, 1989 and U.S. Pat. No. 5,288,512 issued to Seiden, Feb. 22, 1994 for the synthesis and more detailed description of these reduced calorie fats.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

Liquid non-digestible oils have a complete melting point below about 37° C. include liquid polyol fatty acid polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher; U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); all of which are incorporated herein by reference, as well as liquid polydimethyl siloxanes (e.g., Fluid Silicones available from Dow Coming).

Additional Ingredients

Flavoring agents, such as salt, pepper, butter, onion, or garlic may be added to the frying and/or enrobing oil to enhance the flavor or modify the flavor to any desired taste. One skilled in the art will readily appreciate that the aforementioned listing of flavoring agents is in no way exhaustive, but is merely suggestive of the wide range of additives which are suitable for use in the practice of the present invention.

Other ingredients known in the art may also be added to the edible fats and oils used to coat the surface and fry the par-fried potato strips, including antioxidants such as TBHQ, chelating agents such as citric acid, and anti foaming agents such as dimethylpolysiloxane.

While specific preferred processing steps have been disclosed to facilitate an understanding of the invention, the functional equivalents can be substituted or additional ingredients may be added without departing from the spirit or essential characteristics of the present invention. Accordingly, the disclosed embodiments are considered in all respects to be illustrative and not restrictive. Typical parfries, prebake fries and oven-finished fries have the properties outlined in Tables 1, 2 and 3 above.

The oil enrobed prebake fries are oven finished. Table 4 contains suitable baking times and temperatures used in the process of this invention for oven finishing the oil enrobed prebake fries.

TABLE 4

Baking Times and Temperatures

|  | Range #1 | Range #2 | Range #3 | Range #4 |
| --- | --- | --- | --- | --- |
| Bake Time (minutes) | 0.75–15 | 1–10 | 1.5–5 | 2–3 |
| Temperature (° F.) | 325–800 | 350–500 | 375–475 | 400–450 |
| Temperature (° C.) | 162–426 | 176–260 | 190–246 | 204–232 |

The Oven

Some examples of suitable ovens are: forced air convection ovens, combination infrared radiation and convection ovens, radiant heat ovens, toasters, toaster ovens, high velocity air impingement ovens, combination microwave-convection ovens, and infrared radiation ovens. Rotating drum convection ovens or combination infrared-convection ovens can also be used. The baking times will vary somewhat depending on the type of oven and the baking temperature. When toasters are used to finish bake the oil enrobed prebake fries, multiple heating cycles may be required. Conventional microwave ovens can be used for warming frozen prebake fries prior to placing them into another suitable oven for finishing but they do not heat the surface to a high enough temperature to cause it to get crisp unless a susceptor or special container is used. The names of suppliers and models of some suitable ovens are:

1. Forced Air Convection Ovens
   A. Wells Manufacturing Co., Verdi, Nev., Model No. M42003S (Convection oven).
   B. U.S. Range, Gardena, Calif., Model No. BG-100 (Convection Oven).
   C. Blodgett Oven Co., Burlington, Vt, Model No. DFG-100 Convection Oven.
2. Hot Air Impingement Ovens
   A. Lincoln Foodservice Products, Fort Wayne, Ind. (Impinger I oven).
   B. Middleby Marshall, Elgin, Ill.; Model No. PS200, (Double Impingement Oven).
   C. Blodgett Oven Co., Burlington, Vt.; Model No. MT2136; (Mastertherm Conveyor Oven)
3. Infrared Ovens
   Quadlux, Inc., Fremont, Calif.; FlashBake Oven Model No. FB5000
4. Rotating Drum Convection Ovens
   Toastmaster, Elgin, Ill., RoFry, Model RF200
5. Microwave-Convection Combination
   Amana Refrigeration, Inc., Amana, Iowa; Model No. CMA2000; Convection Express Oven
6. Toast-R Oven
   Black & Decker, Shelton, Conn., Model No. TRO200TY.

In one preferred embodiment, the oil-enrobed prebake fries are preferably baked as a single layer on an open mesh metal oven tray or baskel An essentially single layer of fries allows at least a majority of the fries to be in direct contact with the oven tray. Preferably, frozen oil-enrobed fries are first baked on a metal wire mesh oven rack or tray for about 0.5 to about 2 minutes. Then they are transferred to a solid metal oven tray and baked until they are done. This second baking is preferably about 1 to 3 minutes. Generally, prior art frozen potato strips are baked for about 10 to 20 minutes. Faster oven finishing time is one of the primary benefits of this invention. A continuous baking process using metal conveyors can also be used herein to bake the enrobed prebake fries.

The specific oven process conditions used for preparing the oven-finished French fries will depend upon the quantity of prebake fries being baked, their initial temperature, the type of oven, and the thermal properties of the oil-enrobed prebake fries. Of particular importance are the thermal conductivity of the low-moisture crust region, the thermal conductivity of the high-moisture interior starch-matrix core, and the surface heat transfer coefficient of the prebake fry. In general, higher thermal conductivities and higher surface heat transfer coefficients will result in more rapid transfer of heat from the oven to and through the fry, resulting in reduced cooking time. Since it is an object of the present invention to provide a fast food process for quickly finishing frozen par-fries in an oven, these properties are of particular importance. The desirable thermal conductivities at oven temperature of the low moisture crust region in the prebake fry are from about 0.1 to about 0.3 watt/m-° C. The desirable thermal conductivities at oven temperature of the high moisture core region in the prebake fry are from about 0.4 to about 0.7 watts/m-° C. The thermal conductivity of the crust region can be adjusted to the desirable range by controlling the level of moisture and fat in the crust.

The surface heat transfer coefficient of the prebake fry is a function of forced air velocity, air temperature, and the nature of the oil film at the surface of the fry. Higher surface heat transfer coefficients are desirable since this will generally lead to faster cooking time, and the formation of more distinct and crisp low moisture crust region in the oven-finished French fry. The desirable surface heat transfer coefficients at oven temperature of the prebake fry in the oven are from about 50 to about 400 watts/m$^{2-°}$ C. The surface heat transfer coefficient is increased as a consequence of enrobing the parfried potato strips with an edible fat or oil, which increases the conduction of heat from the surrounding air to the fry surface. The surface of the prebake fry may also be modified to improve the absorption of radiant heat from the oven. A typical method of accomplishing this would be to alter the color, porosity, and or reflectivity of the surface. Increasing the velocity of the oven air at the surface of the fry will also increase the surface heat transfer coefficient The oven air velocity should be high enough to achieve a satisfactory heat transfer coefficient, but not so high as to strip away the enrobing oil on the surface.

High quality French fries are golden brown in color and have crisp crusts and moist interiors. The ideal oven-furnished French fries made by the process described herein have the color, texture, mouthfeel and taste of high quality deep fat fried French fries, e.g. McDonald's™ fries.

High Quality Oven-Finished Fries

The process of the present invention provides superior oven-finished French fries. Table 5 contains a detailed description of high quality oven-finished shoestring-cut French fries made by the process of the present invention. These superior oven-finished shoestring-cut French fries have: a bulk moisture of from about 32% to about 46%; preferably 33% to 44%, more preferably 34% to 40% bulk moisture. They also have a total fat content of from about 12% to about 25%, preferably 13% to 23%, more preferably about 14% to 20% total fat. The preferred oven-finished shoestring French fries have an internal moisture content of from about 55% to 80%, preferably about 60% to 77%, more preferably about 63% to about 75% moisture. They have a surface water activity (Surface Aw) equal to or less than about 0.55, preferably from about 0.1 to about 0.52, more preferably from about 0.15 to about 0.5, and even more preferably 0.2–0.45. The texture of fries and baked food products is known to be related in part to the water activity (Aw) of the product, Crisp textures are generally associated with Aw values of less than about 0.55. The preferred oven-finished shoestring French fries have a Texture Value of about 200 or greater, preferably about 210 to 1000, more preferably 220 to 600, and even more preferably 240 to 500.

TABLE 5

HIGH QUALITY OVEN-FINISHED SHOESTRING-CUT FRENCH FRIES*

| | Range | Preferred Range | More Preferred |
|---|---|---|---|
| Bulk Moisture: | 32–46% | 33–44% | 34–40% |
| Total Fat: | 12–25% | 13–23% | 14–20% |
| Internal Moisture‡: | 55–80% | 60–77% | 63–75% |
| Surface Aw: | ≦0.55 | 0.1–0.52 | 0.2–0.45 |
| FFTV**: | ≧200 | 210–1000 | 240–500 |

*High quaility deep-fat fried French fries and the oven-finished French fries of this process invention have all these qualities. The prior art oven-finished French fries do not.
**French Fry Texture Value (Texture Value)
‡Preferred

*High quality deep-fat fried French fries and the oven-finished French fries of this process invention have all these qualities. The prior art oven-finished French fries do not.
**French Fry Texture Value (Texture Value)
‡ Preferred The French Fry Texture Value is measured by a compression test, which is described in detail in the following section on analytical test methods. The French Fry Texture Value Test yields two measurements that characterize the textural properties of French fries, average Maximum Force (grams) and average Area (gram×sec). Both of these texture measurements correlate to the crispness of French fries and either one may be designated as the Texture Value.

As described above and in Tables 5–7, high quality oven-finished French fries are characterized by a Texture Value of about 200 or greater, which means that at least one of the textural parameters (Maximum Force or Area) has a value of about 200 or greater. The most highly preferred oven-finished French fries prepared by the process described herein are further characterized by a ratio of the Area (gram×sec) to the Maximum Force (grams) of at least 1.0, preferably 1.04 or greater, more preferably 1.08 or greater, even more preferably 1.12 or greater, and most preferably 1.16 or greater. The high quality oven-finished French fries made by the process described herein, as well as deep fat fried French fries (e.g., McDonald's™ fries), are characterized by a Texture Value of about 200 or greater and a ratio of the Area to Maximum Force of at least 1.0. For illustration, following are textural data generated for multiple batches of McDonald's™ deep fried French fries:

| Batch # | Avg. Maximum Force (grams) | Avg. Area (gram × sec) | Ratio of Area to Max Force |
|---|---|---|---|
| 1–10 | 227 | 286 | 1.26 |
| 11–20 | 348 | 431 | 1.24 |
| 21–30 | 323 | 403 | 1.25 |
| 31–40 | 266 | 335 | 1.26 |
| 41–50 | 330 | 415 | 1.26 |
| 51–60 | 243 | 294 | 1.21 |

Thicker-cut oven-finished French fries (e.g., regular-cut, crinkle-cut and steak fries) have different moisture and fat ranges. See Tables 6–7 for summaries.

Table 6 contains a detailed description of high quality oven-finished regular or straight cuts and crinkle cut French fries made by the process of the present invention.

TABLE 6

HIGH QUALITY OVEN-FINISHED REGULAR CUTS

|  | Range | Preferred Range | More Preferred |
|---|---|---|---|
| Bulk Moisture | 35–50% | 38–48% | 40–46% |
| Total Fat: | 10–22% | 11–20% | 12–18% |
| Internal Moisture‡: | 55–80% | 60–77% | 63–75% |
| Surface Aw: | ≦0.55 | 0.1–0.52 | 0.2–0.45 |
| Texture Value**: | ≧200 | 210–1000 | 240–500 |

Table 7 contains a detailed description of high quality oven-finished steak fries made by the process of the present invention.

TABLE 7

STEAK FRIES

|  | Range | Preferred Range | More Preferred |
|---|---|---|---|
| Bulk Moisture: | 38–53% | 40–50% | 42–48% |
| Total Fat: | 8–20% | 9–18% | 10–16% |
| Internal Moisture: | 55–80% | 60–77% | 63–75% |
| Surface Aw: | ≦0.55 | 0.1–0.52 | 0.2–0.45 |
| Texture Value**: | ≧200 | 210–1000 | 240–500 |

The oven-finished French fries made by the process described herein can also be characterized, by Nuclear Magnetic Resonance (NMR) imaging, which provides a cross-sectional image depicting the moisture and fat distribution within the fries. The high quality oven-finished French fries made by the process described herein, as well as deep fat fried French fries (e.g., McDonald's™ fries), are characterized by NMR images that reveal a high moisture internal core surrounded by a low moisture crust region that contains the fat.

ANALYTICAL TEST METHODS

A number of parameters are used to characterize elements of the parfried potato strips, oil-enrobed prebake fries, and oven-finished French fries of the present invention. They are quantified by particular experimental analytical procedures. Each of these procedures is described in detail as follows:

Bulk Moisture Content Test

Moisture content of par-fried potato strips, oil enrobed prebake fries and finished French fries is determined by a forced air oven method as follows:

1. Uniformly grind up a representative sample of potato strips or French fries in a blender or conventional food processor.
2. Accurately weigh approximately 5 grams of ground sample (weight "A") into a previously tared metal pan or dish.
3. Place the metal dish containing the sample in a forced air convection oven at 105° C. for 2 hours.
4. After 2 hours, remove the metal dish containing the dried sample and allow to cool to room temperature in a desiccator over a desiccant such as anhydrous calcium sulfate.
5. Re-weigh the dish containing the dried sample and calculate the weight of the dried sample (weight "B") by subtracting the dish tare weight.
6. Calculate the percent moisture of the sample as follows:

% Moisture=[(A−B)/(A)]×100.

French Fry Texture Value Test

The Texture Value of finished French fries, which correlates with crispness of the fries, is measured with a TA-XT2 Texture Analyzer (version 05.16 equipped with 25-1 load cell, Texture Technologies Corp., Scarsdale, N.Y.). The Texture Analyzer is linked to a standard personal computer (e.g. IBM 433DX) that records the data via a software program called XTRA Dimension (version 3.7H, Texture Technologies Corp., Scarsdale, N.Y.).

The Texture Analyzer is configured with a rectangular, blunt steel plate probe (2.5–3.0 mm thickness, 70 mm width, 90 mm length) that is fastened vertically to the main arm. A "Compression Test" on a single French fry will be run to generate a plot of Force (grams) vs. Time (sec), from which the Texture Value is obtained.

| Procedure for Set-up and Calibration of the Texture Analyzer |
|---|
| 1. Set-up the Texture Analyzer as follows: |

| | |
|---|---|
| Mode: | Measure Force in Compression |
| Option: | Return to Start |
| Force Units: | Grams |
| Time Units: | Seconds |
| Distance Format: | Strain |
| Pre-Test Speed: | 2.0 mm/sec |

-continued

| Procedure for Set-up and Calibration of the Texture Analyzer | |
|---|---|
| Probe Test Speed: | 1.0 mm/sec |
| Post-Test Speed: | 10 mm/sec |
| Strain: | 85.0% |
| Trigger Type: | Auto 10 |
| 2. Set the texture method as follows: | |
| Graph Type: | Force vs. Time |
| Auto-Scaling: | Off |
| Force Scaling Max: | 5000 grams |
| Force Scaling Min: | 0 grams |
| Peak Confirmation: | On |
| Force Threshold: | 20 grams |
| File Type: | Lotus 1-2-3 |
| Display and Export: | Plotted points |
| Acquisition Rate: | 200 pps |
| Force Units: | Grams |
| Contact Area: | 1.00 mm$^2$ |
| Contact Force: | 5.0 grams |

3. Calibrate the force by placing a 5 kg weight on the calibration platform and press the "calibrate" button on the Texture Analyzer key pad.
4. Calibrate the probe distance from the base plate with a probe starting distance from the plate of 10 mm for shoestring-cut fries (increase probe starting distance to 15 mm for thick-cut or steak fries). Ensure that the bottom surface of the probe is parallel to the surface of the base plate.

Procedure for Sample Measurements

1. Immediately following removal of finish-cooked French fries from a fryer (deep-fried) or oven (oven-baked), place the batch of fries under a heat lamp for 1 minute prior to beginning the texture analysis. The air temperature under the heat lamp is between about 130° F. and about 180° F. (about 54.3° C. to about 82.2° C.).
2. After the 1 minute hold time has elapsed, place a single French fry flat on the base plate of the Texture Analyzer (oriented perpendicular to the probe width). Initiate the Compression Test (1.0 mm/sec probe speed) while manually holding the ends of the French fry flush against the base plate.
3. The resulting Force (grams) vs. Time (sec) data is saved for later analysis. Nine additional fry samples from the same batch are tested in an identical manner. The ten fry samples from each batch are selected randomly. Texture analysis of the ten fry samples should be completed within 3–4 minutes. (3–4 minutes after Step 1).
4. Steps #1–#3 are repeated for each new batch of French fries. Generally, 5 to 10 batches of each type of French fry are evaluated in this manner.

Data Analysis

1. The "Force vs. Time" plot for each individual French fry sample is evaluated for the following:
   * Maximum Force (grams) within the first ⅓ of the test.
   * Area (gram sec) under the curve within the first ⅓ of the test. (e.g. if the Compression Test requires 6 seconds to complete, the Maximum Force and Area are obtained from the 0–2 second time period).
2. After analysis of the "Force vs. Time" data for all ten French fry samples selected from a given batch, the ten Maximum Force values are averaged and the ten Area values are averaged. A computer program written in Excel automates the task of analyzing the Force vs. Time data for each fry sample and averaging the Maximum Force and Area values for each batch of fries.
3. Remaining batches of a particular French fry type are analyzed in a similar manner (5–10 batches are tested; 10 fries/batch are analyzed). The Maximum Force and Area values for each batch are then averaged to yield an overall average Maximum Force (grams) and Area (gram sec) for that particular fry type.
4. For the purpose of this invention, either the overall average Maximum Force or Area may be designated as the French fry TEXTURE VALUE. Both texture measurements correlate to crispness of finished French fries.

Determination of the Internal Moisture Content of French Fries

Internal moisture content of finished French fries, i.e. moisture content of the interior starch matrix, is determined as follows:

1. Immediately following removal of finish-cooked French fries from a fryer (deep-fried) or oven (oven-baked), immerse the fries in liquid $N_2$ for 20 seconds to completely freeze the products and stabilize the internal moisture distribution.
2. Store the frozen French fries at about –112° F. (–80° C.) until analysis.
3. Remove several fries from the freezer and place on a stainless steel tray. Allow the fries to warm slightly for several minutes at room temperature to facilitate removal of the crust.
4. Carefully cut off the crust on one side of each frozen fry with a razor blade. Rotate the fries and repeat this procedure until the crust has been removed from all four sides.
5. Collect the frozen interior starch matrix (white solidified material) and immediately place in a capped glass vial. Take care only to collect the interior starch matrix; do not include any crust remnants.
6. Repeat steps #3–#5 until approximately 5 grams of frozen interior starch matrix is collected. This may require about 15–20 fries.
7. Accurately weigh approximately 5 grams of the interior starch matrix (weight "A") into a previously tared metal pan or dish.
8. Place the metal dish containing the interior starch matrix in a forced air convection oven at 105° C. for 2 hours.
9. After 2 hours, remove the metal dish containing the dried sample and allow to cool to room temperature in a desiccator over a desiccant such as anhydrous calcium sulfate.
10. Re-weigh the dish containing the dried sample and calculate the weight of the dried sample (weight "B") by subtracting the dish tare weight.
11. Calculate the percent moisture of the interior starch matrix as follows:

% internal moisture=[(A–B)/(A)]×100

Determination of the Surface Water Activity (Aw) of French Fries

Surface Aw of finished French fries is determined as follows:

1. Immediately following removal of finish-cooked French fries from a fryer (deep-fried) or oven (oven-baked), immerse the fries in liquid $N_2$ for 20 seconds to completely freeze the products and stabilize the internal moisture distribution.
2. Store the frozen French fries at about –112° F. (–80° C.) until analysis.
3. Transfer a bag of French fries (~0.5–1 lb.) from the –112° F. (–80° C.) freezer to a cooler containing dry ice; ensure the bag is thoroughly packed in dry ice in order to maintain the fries in a frozen state at low temperature.

4. Remove one French fry at a time from the sample bag and rapidly scrape the surface of the fry with a single-edged razor blade. Collect the surface shavings onto a stainless steel tray and immediately transfer the shavings to a capped glass vial.

Take care only to colect surface shavings from the outer crust region of the French fry; do not scrape so hard such that the crust region is penetrated and the interior starch matrix core is exposed.

5. Repeat step #4 until approximately 0.3–0.7 gram of surface shavings is collected; this will require scraping about 10–20 frozen fries.
6. Determine the water activity (Aw) of the surface shavings using a Rotronic Hygroskop Model DT relative humidity meter (Rotronic Instrument Corp., Huntington, N.Y.), as follows:
    a. Transfer the surface shavings to a plastic Aw dish (Rotronic Instrument Corp.).
    b. Immediately place the Aw dish containing the surface shavings into one of the humidity cells of the Hygroskop Model DT relative humidity meter and close the cell cover tightly.
    c. Allow the meter reading to stabilize (wait 1 hour or longer) before recording the reading and temperature.
    d. Convert the stabilized meter reading to % Relative Humidity (RH) using a previously prepared calibration graph (meter reading vs. % RH) prepared with the following RH standards:

| | |
|---|---|
| 11% RH | Saturated solution of Lithium Chloride (see Greenspan, L., 1977, J. Res. Natl. Bur. Stand., Section A, 81A 89) |
| 35% RH | Standard solution from Rotronic Instrument Corp. |
| 50% RH | Standard solution from Rotronic Instrument Corp. |
| 65% RH | Standard solution from Rotronic Instrument Corp. | e. Convert % RH of the surface shavings to Surface Aw as follows:

Surface Aw=[% RH/100].

Total Fat Content Test

Total fat content of par-fried potato strips, oil-enrobed prebake fries, and finished French fries is determined by a solvent extraction method as follows:

Apparatus
1. Soxtec HT6 extraction system; unit includes heating block and cooling condenser.
2. Recirculating water bath for cooling condenser.
3. Recirculating oil bath for heating block.
4. Extraction beakers.
5. Extraction thimbles, 26 mm (Fisher TC1522-0018).
6. Nitrogen purging gas
7. Vacuum drying oven
8. Analytical balance (4 place)
9. Dispensing pipette (50 ml)

Materials
1. Methylene chloride (Baker 9315-33)
2. Boiling stones (Chemware PTFE Fisher 09-191-20)
3. Silicone oil (Fisher TC1000-2779)
4. Glass wool (Fisher 11-390)

Procedure
1. Uniformly grind a representative sample of potato strips or French fries in a blender or conventional food processor.
2. Accurately weigh (to four places) a piece of glass wool (sufficient in size to contain sample pieces in the thimble) and the extraction thimble; record weight of thimble+glass wool (weight "A").
3. Load the ground sample into the thimble and cap the loaded thimble with the pre-weighed piece of glass wool.
4. Accurately weigh (to four places) and record the weight of the ground sample, thimble,+glass wool (weight "B").
5. Place two or more boiling stones into an extraction beaker and weigh (to four places); record weight of extraction beaker+boiling stones (weight "C").
6. Place loaded thimbles on the extraction unit and raise the thimbles to rinse position.
7. Pipette 50 ml of methylene chloride into each pre-weighed extraction beaker with boiling stones.
8. Set oil heating bath to 110° C. and water cooling bath to 28.3° C. and allow temperatures to equilibrate.
9. Lower the loaded thimbles into the extraction beaker containing the solvent and allow to boil in the solvent for 60 minutes with the condenser's pet cock in the open position.
10. Raise the thimbles to the rinsing position and rinse for 60 minutes.
11. Turn the condenser's pet cock to the closed position and allow the solvent to evaporate for 60 minutes. Turn the nitrogen purging gas on to aid the evaporation.
12. Transfer the beaker to a vacuum oven, pre-warmed to 120° C., for 30 minutes at full vacuum (about 30 mm Hg pressure or less).
13. Allow the beaker to cool to room temperature and weigh (to four places); record the weight of the beaker+boiling stones+extracted fat (weight "D").
14. Calculate percent total fat as follows:

% Fat=[(D−C)/(B−A)]×100

EXAMPLES

The following are non limiting examples of the present invention.

Example 1

High quality frozen commercially available shoestring cut par-fries (e.g., Simplot Par Fries, J. R. Simplot Co., Caldwell, Id.) are acceptable starting products. The par-fries have a moisture content of about 64%. About 1 lb. of the par-fries are deep fried in a 45 lb. oil capacity fryer containing Primex 108 vegetable oil (blend of partially hydrogenated soybean oil and corn oil; available from the Procter & Gamble Co.) for about 3 minutes at a temperature of about 290° F. (144° C.). The par-fries are then immediately frozen by immersion in liquid nitrogen for about 20 seconds. The moisture content of the resulting par-fry is about 48% and the fat content is about 14%. Immediately after being frozen the par-fries are enrobed with oil by immersing in liquid vegetable oil (conditioned Primex 108) having a temperature of about 335° F. (−168° C.) for about 1–3 seconds. The resulting oil-enrobed prebake fries are again frozen by immersion in liquid nitrogen. The frozen prebake fries are packed into tightly sealed packages and stored at normal freezer temperatures of approximately 0° F. (−18° C.) to about −20° F. (−29° C.). The prebake fries contain about 10% surface fat by weight of the fries. The total fat level is about 22% and the bulk moisture level is about 43%.

About 128 grams of the above frozen prebake fries are placed on an open wire mesh oven tray in a single layer and then baked at a temperature of about 400° F. (204° C.) in a forced air convection oven (Wells Manufacturing Co.; Model No. M42003S) for about 1 minute. Then the fries are transferred to a solid stainless steel oven tray in a single layer and baked an additional 1.5 minutes. The resulting French fries have: a bulk moisture of about 38%, a fat content of about 18%; an internal moisture content of about 67%, a Surface Aw of about 0.3, and a French Fry Texture Value of about 240 (Max. Force=205g; Area=243 g×sec.; Ratio of Area to Max. Force=1.19). The oven-finished French fries are virtually identical in flavor and texture to deep fried French fries, e.g., from McDonald's.

Example 2

Commercially available frozen shoestring-cut par-fried potato strips (e.g. Payette Farms Shoestring Frozen Potatoes, J. R. Simplot Co., Caldwell, Id.) are obtained for additional processing. The parfries have a bulk moisture content of about 70%.

The above-mentioned par-fried potato strips are further processed. First, about 1 lb. of the frozen potato strips are fried in a 45 lb. fryer containing Primex 108 vegetable oil (blend of partially hydrogenated soybean oil and corn oil; available from The Procter & Gamble Co.) for 3 minutes at a temperature of about 335° F. (~168° C.). The par-fried potato strips are then frozen in liquid nitrogen for 20 seconds and stored at −20° F. (−29° C.). The par-fried potato strips have a moisture content of about 44% and a fat content of about 14%. The frozen par-fried potato strips are enrobed with oil by immersing in liquid vegetable oil (conditioned Primex 108) having a temperature of about 335° F. (~168° C.) for about 1–3 seconds. The resulting oil-enrobed prebake fries are then frozen by immersion in liquid nitrogen for about 20 seconds. About 10% fat is on the surface of the frozen oil-enrobed prebake fries. The oil-enrobed prebake fries have about 40% moisture content and about 23% fat.

About 128 grams of the frozen prebake fries are placed on an open wire mesh oven tray in a single layer and then baked at a temperature of about 400° F. (~204° C.) in a forced air convection oven (Wells Manufacturing Company, Verdi, Nev. Model No. M42003S) for about 1 minute. Then the fries are transferred to a solid stainless steel oven tray in a single layer and baked an additional 1.25 minutes. The resulting French fries have: a bulk moisture of about 38%; a total fat content of about 19%; an internal moisture content of about 68%; a Surface Aw of about 0.4, and a French Fry Texture Value of about 260 (Max. Force=239 g; Area=260 g×sec.; Ratio of Area to Max. Force=1.09). The oven-finished French fries are virtually identical in taste and texture to high-quality deep fried French fries.

Example 3

The commercially available frozen shoestring-cut parfries of Example 2, which have a bulk moisture content of about 70%, are used as the starting material.

The above-mentioned par-fried potato strips are further processed. First, about 1 lb. the frozen potato strips are fried by immersing in Primex 108 vegetable oil (blend of partially hydrogenated soybean oil and corn oil; available from The Procter & Gamble Co.) for 3 minutes at a temperature of about 335° F. (~168° C.). The par-fried potato strips are then frozen in liquid nitrogen for 20 seconds and stored at 0° F. (−18° C.). The frozen par-fried potato strips have a moisture content of about 44% and a fat content of about 14%. The frozen par-fried potato strips are then enrobed with oil by spraying warm (~150° F.) conditioned Primex 108 oil onto the surface of the frozen par-fries. About 5% fat is applied to the surface of the frozen par-fry by the spray enrobing process. The resulting oil-enrobed prebake fries comprise about 42% moisture and about 18% fat and are stored frozen at 0° F. (−18° C.) until oven finishing.

The frozen oil-enrobed prebake fries are finished in a conventional home oven (General Electric). About 0.5 lb. of the prebake fries are placed onto a solid stainless steel baking tray in a single layer and baked for 6–7 minutes at a temperature of 425° F. (~218° C.). The finished French fries have a crisp crust, a moist interior, and taste very similar to good deep-fat fried French fries.

Example 4

A reduced calorie fat composition is used to prepare enrobed prebake fries. The fat composition contains a non-digestible fat component and a "conventional" triglyceride component. The nondigestible fat component comprises a blend of a liquid and solid sucrose polyester (SPE) e.g., OLEAN®, made by The Procter & Gamble Company. The nondigestible fat component is added to refined, bleached and deodorized soybean oil and the resulting blend is heated until all the solids are dissolved to provide a fat composition containing 75% SPE and 25% soybean oil.

Russet Burbank potatoes at about 20% potato solids content are peeled, washed and cut into ¼" wide×3½" long potato strips to make shoestring style French fried potatoes. The potato strips are blanched in hot water (140° F. 60° C.) for about 5 minutes. The blanched potato strips are allowed to equilibrate at ambient conditions for 5 minutes followed by partial drying in an oven.

The partially dried potato strips are then fried in the above-mentioned fat composition for 90 seconds at about 375° F. (~190° C.) followed by freezing to make frozen par-fries. The frozen par-fries comprise about 55% moisture and about 11% fat. The frozen par-fried potato strips are then enrobed with the reduced calorie fat composition by immersing the frozen parfries in the fat composition having a temperature of about 335° F. (~168° C.) for about 1–3 seconds. The resulting prebake fries are again frozen. The frozen oil-enrobed prebake fries have about 12% oil coated on the surface; they comprise about 48% bulk moisture and about 22% total fat.

About 128 grams of the frozen oil-enrobed prebake fries are placed on an open wire mesh tray in a single layer and then baked at a temperature of about 425° F. (218° C.) in a forced air convection oven (Wells Manufacturing Company, Verdi, W.Va., Model #M42003S) for about 3 minutes. If desired, the French fries may then be subjected to a short (i.e. 5–30 sec.) blast of hot air or gas at high velocity to remove any excess surface fat and control greasiness of the finished fries. The resulting reduced calorie French fries have: a bulk moisture of about 40%; a total fat content of about 15%; an internal moisture content of about 65%; a Surface Aw of about 0.4 and a French Fry Texture Value of about 250.

These oven-finished French fries are virtually indistinguishable from deep fat fried French fries.

What is claimed:

1. A method for preparing a French fry which comprises baking an oil enrobed prebake parfry, having from about 34% to about 58% moisture, from about 6% to about 30% fat and a surface coating of oil wherein the surface coating of oil comprises from about 2% to about 15% by weight of the prebake parfry, in an oven at a temperature of from about 325° F. (162° C.) to about 800° F. (426° C.) for about 0.75 to about 15 minutes to form an oven finished French fry having from about 32% to about 53% bulk moisture, from about 8% to about 25% total fat and an average maximum force of at least about 200 grams or average area of at least about 200 gram seconds.

2. The method of claim 1 wherein the oil enrobed prebake par-fry has from about 36% to about 56% moisture and from about 8% to about 28% fat and wherein the oven finished French fry has a bulk moisture content of from about 35% to about 50% and a total fat content of from about 10% to about 22%.

3. The method of claim 1 wherein the oil enrobed prebake par-fry has from about 42% to about 50% moisture and from about 14% to about 20% fat, wherein the oil enrobed prebake parfry is baked at a temperature of from about 350° F. (176° C.) to about 475° F. (246° C.) for about 1 to about 5 minutes and wherein the oven finished French fry has a bulk moisture content of from about 40% to about 46% and a total fat content of from about 12% to about 18%.

4. The method of claim 1 wherein the oil enrobed prebake parfry has from about 44% to about 52% moisture and from about 10% to about 18% fat, wherein the oil enrobed prebake parfry is baked at a temperature of from about 350° F. (176° C.) to about 475° F. (246° C.) for about 1 to about 5 minutes and wherein the oven finished French fry has a bulk moisture content of from about 42% to about 48% and a total fat content of from about 10% to about 16%.

5. The method of claim 1 wherein the oil enrobed prebake parfry has from about 38% to about 50% moisture, from about 12% to about 26% fat, from about 3% to about 12% surface coating of oil, wherein the oil enrobed prebake parfry is baked at a temperature of from about 350° F. (176° C.) to about 475° F. (246° C.) for about 1 to about 5 minutes and wherein the oven French fry has a bulk moisture content of from about 34% to about 40% and a total fat content of from about 14% to about 20%.

6. The method of claim 5 wherein the oil enrobed prebake parfry is baked at a temperature of from about 375° F. (190° C.) to about 450° F. (232° C.) for less than about 3 minutes and wherein the oven finished French fry has a surface water activity of from about 0.1 to about 0.45 and an internal moisture content of from about 63% to about 75%.

7. The method of claim 1 wherein the oven finished French fry has a surface water activity of less than about 0.55 and an internal moisture content of from about 55% to about 80%.

8. The method of claim 7 wherein the oven finished French fry has a surface water activity of from about 0.1 to about 0.45 and an internal moisture content of from about 63% to about 75%.

9. The method of claim 8 wherein the total fat comprises a polyol fatty acid polyester.

10. The method of claim 1 wherein the oil enrobed prebake parfry comprises a crust region having a thermal conductivity of from about 0.1 to about 0.3 watts/m° C., an interior starch matrix core having a thermal conductivity of from about 0.4 to about 0.7 watts/m° C., and a surface heat transfer coefficient of from about 50 to about 400 watts/$^2$° C.

11. The method of claim 1 wherein the total fat has a free fatty acid level of less than 0.8%.

12. The method of claim 1 wherein the total fat is selected from the group consisting of triglycerides, nondigestible fats, partially indigestible fats, reduced calorie fats and mixtures thereof.

13. The method of claim 12 wherein the oil enrobed prebake parfry has from about 40% to about 48% moisture, from about 16% to about 24% fat and wherein the oil enrobed prebake parfry is baked at a temperature of from about 375° F. (190° C.) to about 450° F. (232° C.) for less than about 3 minutes.

14. The method of claim 1 wherein the surface coating of oil is a conditioned or flavored oil.

15. The method of claim 14 wherein the total fat is a conditioned or flavored oil.

\* \* \* \* \*